United States Patent

[11] 3,607,125

| [72] | Inventor | Paul H. Kydd<br>Scotia, N.Y. |
|---|---|---|
| [21] | Appl. No. | 787,971 |
| [22] | Filed | Dec. 30, 1968 |
| [45] | Patented | Sept. 21, 1971 |
| [73] | Assignee | General Electric Company |

[54] REFORMER TUBE CONSTRUCTION
5 Claims, 2 Drawing Figs.

[52] U.S. Cl. ............................................. 23/288 M,
 23/277, 48/94, 48/196, 122/319, 122/510, 165/81,
 165/134, 165/142
[51] Int. Cl. ............................................. B01j 9/04,
 F28d 7/12, F28f 1/00
[50] Field of Search............................................. 23/288.9,
 288.91, 288.92, 277, 1 B, 1; 48/196, 94, 113;
 196/110, 133; 122/510, 319, 235 N; 165/142, 81,
 134

[56] References Cited
UNITED STATES PATENTS

| 641,656 | 1/1900 | Taylor | 122/319 UX |
| 2,472,254 | 6/1949 | Johnson | 23/288.9 M X |
| 2,503,148 | 4/1950 | Balmer | 122/235 N |
| 2,577,729 | 12/1951 | Bauer | 23/277 |
| 2,660,519 | 11/1953 | McCarthy | 23/288 M |
| 2,852,358 | 9/1958 | Stengel | 23/288 M X |
| 3,119,671 | 1/1964 | Koniewiez et al. | 23/288 M X |
| 3,270,780 | 9/1966 | Kydd et al. | 138/148 |
| 3,446,277 | 5/1969 | White | 165/142 X |

*Primary Examiner*—Joseph Scovronek
*Attorneys*—Richard R. Brainard, Paul A. Frank, Charles T. Watts, Leo I. Ma Lossi, Frank L. Neuhauser, Oscar B. Waddell and Melvin M. Goldenberg

ABSTRACT: Reformer tube construction is described within which both the desired endothermic catalyzed chemical reaction and heat transfer from the reaction products to the incoming reactants are accomplished. This reformer tube construction eliminates the need for a hot manifold and comprises (in a coaxial tube arrangement) a centrally located product tube and an outer composite wall spaced therefrom with catalyst occupying the annular space therebetween. The composite outer wall combines an inner impermeable metal tube with an outer protective refractory casing.

Fig. 2.

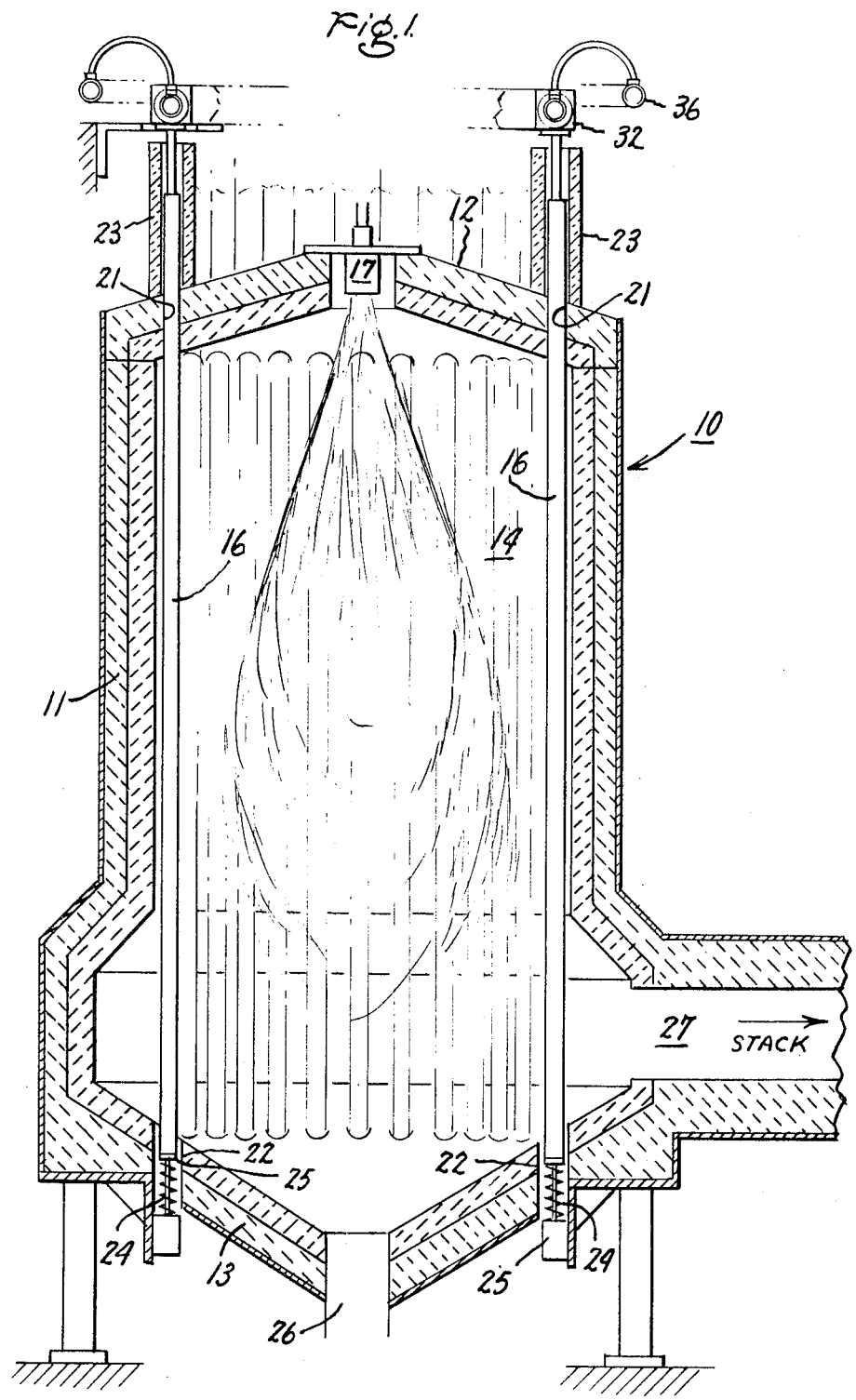

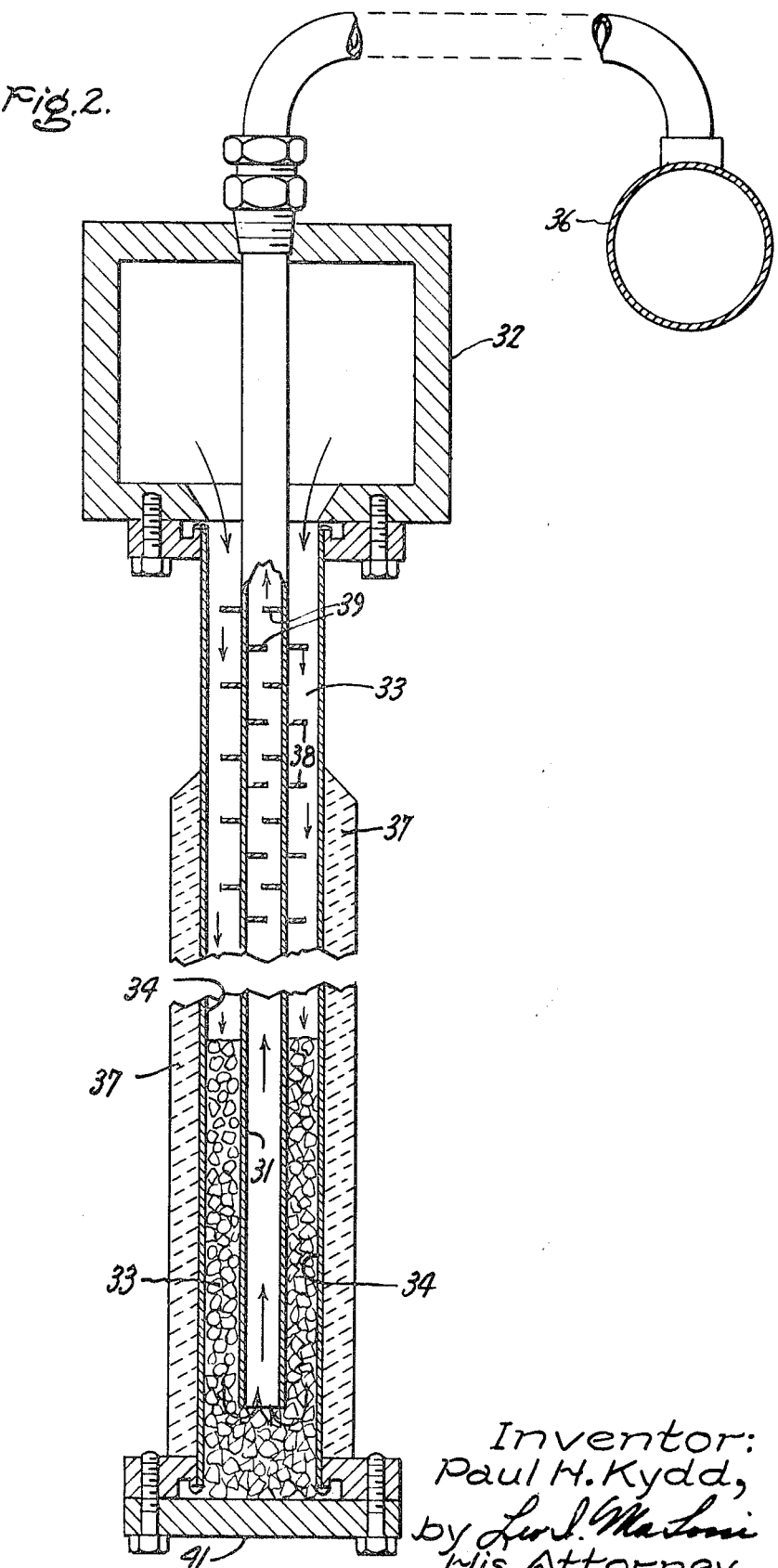

REFORMER TUBE CONSTRUCTION

BACKGROUND OF THE INVENTION

Hydrocarbon reforming furnaces for the catalytic reaction of fluid hydrocarbons with steam are well known. In typical construction suspended catalytic reformer tubes receive input reactants from an upper manifold and pass the products to a lower manifold, although this arrangement may be reversed.

In one well-known process a hydrocarbon fluid, such as methane, is catalytically reacted with steam at elevated temperatures, to produce a reformed gas mixture containing principally hydrogen, carbon monoxide and carbon dioxide. The reaction is preferably carried out at elevated pressures, although operation at substantially atmospheric pressure is also practiced. The overall reaction is endothermic, and consequently the usual procedure for carrying out the reaction is to pass an input mixture of hydrocarbon and steam through an externally heated tube, or group of tubes, these tubes being packed with solid catalyst granules. The resulting product (reformed gas mixture) is withdrawn from the tubes of the reformer unit and may be passed on for subsequent processing, if required.

External heating of the catalyst-filled reformer tubes is usually provided by burning a hydrocarbon fuel with air, although other types of heating, as for example electrical resistance-type heating, have been employed. Since the reforming reaction must be carried out at a significantly elevated temperature, it is common to employ either internally or externally located waste heat boilers to recover sensible heat from the flue gas. Burners are usually disposed at the bottom and sides of the furnace unit to provide external heating for the reformed tubes and truly uniform heating thereof has been a prime objective.

SUMMARY OF THE INVENTION

Processing economies have been constantly sought in this art and the instant invention provides improved reactor tube construction, which protects against the adverse affects of sulfur-containing fuels, eliminates the need for a hot manifold (as well as the difficulty encountered in making connections thereto), accomplishes substantial savings in the recovery of sensible heat from the reaction products and simultaneously heats the incoming reactants.

These improvements are provided in a reformer tube construction employing a plurality of cylindrical members disposed in a coaxial arrangement comprising a centrally located product tube disposed within an outer composite wall spaced therefrom with the annular space therebetween occupied by solid catalyst present as grains or specially formed shapes. The composite outer wall employs in combination an inner impermeable metal tube by which the composite wall is suspended from the product manifold and a protective refractory casing forming the outer cover for this metal tube.

BRIEF DESCRIPTION OF THE DRAWING

The exact nature of this invention as well as other objects and advantages thereof will be readily apparent from consideration of the following specification relating to the annexed drawing in which:

FIG. 1 is a schematic overall section in elevation of a reformer furnace unit showing the disposition of a plurality of the reformer tubes of this invention and FIG. 2 is a more detailed elevational section through a reformer tube embodying the instant invention.

DESCRIPTION OF THE PREFERRED EMBODIMENT

Referring now to FIG. 1, the reformer furnace unit 10 is defined by container wall 11, roof 12 and floor 13. These confining walls are generally internally lined with conventional refractory material, such as fire brick, to maintain a thermal barrier. A wall of insulating brick is preferably employed as an exterior cover for the fire girding combustion zone 14. Container wall 11 may be in the form of a generally vertically extending hexagonal prism or right-circular cylinder although other configurations may be employed.

The volume within furnace 10 consists primarily of combustion zone 14 in which are suspended the reformer tubes 16. For simplicity, the furnace unit 10 is illustrated as having only a single burner 17 centrally located to provide a blossom of flame in zone 14 to heat the exterior of tubes 16, which are suspended in banks, six of which banks define a hexagonal shape. Reformer tubes 16 could, of course, be suspended in a right circular cylindrical arrangement or in the shape of a rectangular solid of square cross section with burner 17 located along the axis thereof. Any of the aforementioned patterns could be repeated many times in a reformer furnace unit able to accommodate a larger number of combustion zones and burners therefor. Thus, for a hexagonal pattern a repetition thereof would have the appearance of a honeycomb when viewed in plan. It may be appreciated that in the aforementioned multiple-burner arrangements more uniform exposure of the vertical tubes 16 to radiation from the large blossom of flame to either side thereof would result.

The reformer tubes 16 are suspended from a continuous supply manifold and pass through a plurality of holes 21 and 22 penetrating roof 12 and floor 13 as shown. The portions of tubes 16 extending above roof 12 are covered with lagging 23 for insulation thereof. If required, the weight of each catalyst-laden tube 16 may be offset in part or entirely by an upwardly acting spring 24, while the axial stress on the tube due to internal pressure, which may vary, can be compensated by a pressure-actuated piston and cylinder 25. In place of spring 24 a weighted lever structure could be employed.

Because the improved reactor tube construction and the disposition of tubes for more uniform heating of the exterior thereof described herein are ideally suited to the use of powdered coal as a fuel for burner 17, floor 13 is sloped to more readily collect and dispose of ash and residue as it accumulates. Such waste material may be removed through access door 26. Although the furnace construction shown in FIG. 1 is supported in an elevated position by means of structural steel shapes, other means of structural support, as for example reinforced concrete columns, may be employed. The gaseous products of combustion are removed from the furnace 10 via flue 27 for eventual conduct to a stack (not shown).

As shown in greater detail in FIG. 2, the reformer tube 16 comprises a centrally located product tube 31 around which process gas (usually under pressure) enters from process gas (supply) manifold 32 passing downwardly through the annular, catalyst-filled space 33 between metal liner 34 and product tube 31. Near the bottom end of reformer tube 16, the process gas enters product tube 31 and rises therethrough to enter product manifold 36.

Concentrically positioned around the impervious metal tube 34 is one or more refractory casing sections 37 (for example, a ceramic made from the various forms of silicon carbide, such as clay bonded, nitride bonded or self-bonded silicon carbide). Refractory casing 37 provides strength at high temperatures to prevent the liner 34 from bursting under internal pressure due to creep rupture. The liner tube 34, which together with the centrally located product tube 31 defines annular space 33, serves in several capacities; namely, to contain the pressurized process mixtures being heated during passage therethrough, containing the catalyst for the reaction and (being connected at its upper end to supply manifold 32) supporting (entirely or in part) its own weight, the weight of casing 37 and the catalyst disposed in annular space 33.

The casing 37 extends above roof 12 to some point at which tube 34 will be strong enough at operating temperatures to support the internal pressure as well as the weight of the suspended unit. If desired, tube wall 34 may be thickened or may be changed to a different material where it extends beyond protective casing 37.

As is described more fully in U.S. Pat. No. 3,270,780—Kydd et al. (the disclosure of which is incorporated herein by reference) the materials of any given combination of tube 34 and casing 37 are selected. A predetermined radial cold gap (clearance) is necessary between the tube 34 and the casing 37. This clearance is based upon the differences in expansion characteristics of the materials so that at the peak temperature to which the composite will be subjected during operation the radial expansion of the metal liner tube (34), which has a greater coefficient of expansion than the casing component, will cause it to expand and come into tight physical contact with the inner surface of the outer casing (37). The components (34 and 37) so unified by expansion at the operating temperatures combine their complementary properties so that the tube 34 contributes the attribute of leak-tightness to the composite and the outer casing contributes the attribute of high strength required to resist the internal pressures encountered.

The regenerative function of the improved reformer tube construction of this invention is optimized by attaching projecting fins 38, 39 inside and outside, respectively, the top one-third to one-half of the total length of inner product tube 31. A continuous helical fin projection or other well-known extended heat transfer surfaces may be employed, if desired. In this manner the heating of the incoming process gas and simultaneous cooling of the exiting product gas in heat exchange therewith is rapidly accomplished in this convection region both because the gases present on either side of tube 31 are generally at high pressure and because the inner and outer surface area of tube 31 has been increased. Since the pressure drop across the wall of the inner tube 31 is primarily that due to driving the gas through the solid catalyst in annular volume 33, the wall of product tube 31 can be as thin as one thirty-second of an inch.

In an operative example, six banks (eight tubes each) of 13 feet reformer tubes (2¾ inch outside diameter) would provide a total outside heating area of 450 square feet. Firing can be by the use of pulverized coal, char, residual oil or distillate oil, for example. Process feed consisting of a mixture of 210–1050 pph (pounds per hour) of natural gas and 1,500–7,500 pph saturated steam at a pressure ranging from about 140 to 1,000 p.s.i. absolute enters from manifold 32 into annular space 33. The temperature of the catalyst (for example alumina-supported nickel reforming catalyst or other commercially available catalyst) in space 33 is maintained in the range from about 1,500° to 1,800° F. Depending on the products desired the unit may be made to function as a reformer or as a cracking tube. With the reformer tube functioning as a reformer, the heat flux would range from 4,000 to 20,000 B.t.u.'s per square foot-hour. If it were desired to utilize furnace 10 as a cracking furnace, the heat flux would be increased to the range from about 10,000 to 50,000 B.t.u./sq. ft.-hr. The total radiant heat flux for the reformer function would range from about 1.8 to $9 \times 10^6$ B.t.u.'s per hr. and used as a cracking furnace the total radiant heat flux would range from about 4.5 to $22.5 \times 10^6$ B.t.u.'s/per hr. An analysis of the reformed product flow could, for example, be as follows:

101–505 pph hydrogen
206–1,030 pph carbon monoxide
326–1,630 pph carbon dioxide
1.070–5,350 pph steam.

The incoming process feed would be at or above the saturation temperature of steam or a liquid hydrocarbon feed at operating pressure. With the incoming process feed from manifold 32 passing downwardly through annular space 33 at the same time as product gases are moving upwardly within product tube 31 a regenerative heating effect takes place. This heat exchange results in the simultaneous heating of the process feed and cooling of the product gases (from the operating temperature to a manifold temperature of about 500° to 1,200° F.) to within a temperature range permitting the use of carbon steel or standard weight stainless steel piping with standard bolted fittings in place of heavy wall all-welded stainless steel construction required for temperatures in the range of 1,500°–1,800° F. Because of this capability for using standard bolted fittings, manifolds 32 and 36 may be dismantled in sections so that separate bands of reformer tubes 16 can be removed for servicing, as for example, for inspection or refilling with catalyst. After removal of a bank of tubes, individual composite walls (elements 34 and 37) may be disconnected from manifold 32. Such servicing capability is highly desirable and is not available where hot manifolds are required and where the reformer tubes are fixed at both the top and bottom ends. The process gas mixture rapidly reaches operating temperature and moves down through the concentration of catalyst, which promotes the reforming reactions. The reformed products then enter the lower end of inner tube 31 and move up to product manifold 36. The spent combustion gases leave through flue 27 and proceed to the stack.

The reformer tube assemblies can be hung vertically as shown with the thermal stress therein being minimized, because the lower ends of the tubes are not connected to any manifold, as is customary. Spent catalyst can be removed simply be removing cap 41, thereby reducing the weight when lifting tubes 16. After removal, it is a simple matter to refill tubes 16 with catalyst through the lower end by turning the tubes 16 upside down.

Obviously, if it should prove advantageous to do so, the direction of process flow through the apparatus of this invention may be reversed. In such case, the process gas would enter through the centrally located tube and exit, after passage through the catalyst, along the annular space between the centrally located tube and the composite wall. Utilization of the apparatus in the manner described in the specification is preferred.

What I claim as new and desire to secure by Letters Patent of the United States:

1. In a furnace a manifold and reactor tube construction for the conduct of high-temperature catalyzed reactions in portions of the reactor tubes heated in the furnace combustion zone comprising in combination:
   a. a furnace structure providing confining walls for a combustion zone,
   b. a generally horizontally disposed first manifold located above said furnace structure,
   c. a longitudinally extending cylindrical composite wall depending from said first manifold and being closed at the lower end thereof, said composite wall passing through the roof of said furnace structure,
   1. said composite wall consisting in section of an outer refractory casing and a thin impervious metal liner located substantially concentrically therewithin; said metal liner having a coefficient of expansion greater than said refractory casing, fitting loosely therein in the unheated condition and receiving radial support therefrom under operating temperature conditions; said first manifold and the interior volume of said metal liner being in flow communication,
   d. an inner tube extending within, spaced from and generally coaxially of said composite wall, said inner tube being in flow communication with the interior volume of said metal liner near the lower end thereof,
   e. a generally horizontally disposed second manifold in flow communication with the interior volume of said inner tube at the upper end thereof, said second manifold being located outside said furnace structure,
   f. heat transfer surfaces extending from both the outer and inner surfaces of about the upper one-third to one-half of the total length of said inner tube and
   g. a mass of particulate catalyst disposed in the closed lower end of said composite tube, some of said mass extending into the space between said inner tube and said liner.

2. The manifold-reactor tube construction as recited in claim 1 wherein the upper end of the inner tube extends through the first manifold to the second manifold.

3. The manifold-reactor tube construction as recited in claim 1 wherein the manifolds comprise sections of manifold joined together with standard bolted fittings.

4. The manifold-reactor tube construction as recited in claim 1 wherein the metal liner of the composite wall is joined to the first manifold, said composite wall being suspended thereby.

5. The manifold-reactor tube construction as recited in claim 1 wherein the first manifold is connected to a source of process gas under pressure.